US011190825B1

(12) United States Patent
Grover

(10) Patent No.: US 11,190,825 B1
(45) Date of Patent: Nov. 30, 2021

(54) CONTENT MODIFICATION SYSTEM WITH PRIORITIZED CONTENT DELIVERY FEATURE

(71) Applicant: Roku, Inc., San Jose, CA (US)

(72) Inventor: Matthew George Grover, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/229,129

(22) Filed: Apr. 13, 2021

Related U.S. Application Data

(60) Provisional application No. 63/148,575, filed on Feb. 11, 2021.

(51) Int. Cl.
*H04N 21/262* (2011.01)
*H04N 21/44* (2011.01)
*H04N 21/647* (2011.01)
*H04N 21/81* (2011.01)

(52) U.S. Cl.
CPC . *H04N 21/26241* (2013.01); *H04N 21/44016* (2013.01); *H04N 21/64738* (2013.01); *H04N 21/812* (2013.01)

(58) Field of Classification Search
CPC ....... H04N 21/26241; H04N 21/44016; H04N 21/64738; H04N 21/812
See application file for complete search history.

*Primary Examiner* — Anthony Bantamoi
(74) *Attorney, Agent, or Firm* — McDonnell Boehnen Hulbert & Berghoff LLP

(57) ABSTRACT

A computer-implemented method includes receiving from content presentation devices a request for supplemental content. Each content presentation device is configured to present program content received from a content distribution system. The program content is associated with a program schedule that specifies an advertisement start time. The computing system determines a supplemental content processing time that corresponds to an amount of time required by a particular content presentation device to receive the supplemental content to facilitate presentation of the supplemental content. The computing system schedules the content presentation devices to receive requested supplemental content according to corresponding supplemental content processing times and advertisement start times. Content presentation devices having higher supplemental content processing times and earlier advertisement start times are scheduled to begin receiving requested supplemental content before content presentation devices associated with lower supplemental content processing times and later advertisements start times.

20 Claims, 16 Drawing Sheets

| Time Period | Content Distribution System 102 | Content-Presentation Device 104 | Fingerprint-Matching Server 106 | Content Management System 108 | Data-Management System 119 | Supplemental Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| Time Period | Content Distribution System 102 | Content-Presentation Device 104 | Fingerprint-Matching Server 106 | Content Management System 108 | Data-Management System 110 | Supplemental Content Delivery System 112 |
|---|---|---|---|---|---|---|
| T9 | | | Compare first fingerprint data and second fingerprint data | | | |
| T10 | | | Detect a match between first fingerprint data and second fingerprint data | | | |
| T11 | | | Identify the channel on which the second content is being received | | | |
| T12 | | | Generate metadata associated with the identified channel | | | |
| T13 | | | Transmit an indication of the identified channel and the associated metadata | | | |
| T14 | | | | | Receive the indication of the identified channel and the associated metadata | |

Figure 4B

|  |  |  |  |  |  |  |  |  |
|---|---|---|---|---|---|---|---|---|
| T15 |  |  | Determine historical content consumption data |  |  |  |  |  |
| T16 | Transmit third content |  |  |  |  |  |  |  |
| T17 |  | Generate third fingerprint data and third metadata |  |  |  |  |  |  |
| T18 |  | Transmit third fingerprint data and third metadata |  |  |  |  |  |  |
| T19 |  |  |  | Receive modifiable content segment |  |  |  |  |
| T20 |  |  |  |  | Generate fourth fingerprint data and fourth metadata |  |  |  |
| T21 |  |  |  |  | Transmit fourth fingerprint data and fourth metadata |  |  |  |
| T22 |  |  |  |  |  | Receive third fingerprint data and third metadata |  |  |
| T23 |  |  |  |  |  | Receive fourth fingerprint data and fourth metadata |  |  |

Figure 4C

| | | | | | | | |
|---|---|---|---|---|---|---|---|
| T24 | | Compare at least a portion of third fingerprint data and at least a portion of fourth fingerprint data | | | | | |
| T25 | | Detect a match between at least a portion of third fingerprint data and at least a portion of fourth fingerprint data | | | | | |
| T26 | | Identify an upcoming content modification opportunity on the identified channel | | | | | |
| T27 | | Transmit the third fingerprint data and the third metadata | | | | | |
| T28 | | | Receive third fingerprint data and third metadata | | | | |
| T29 | | | Receive fifth content | | | | |
| T30 | | | Output for presentation fifth content | | | | |

Figure 4D

| | | | | | | | |
|---|---|---|---|---|---|---|---|
| | | | | | | | Transmit link |
| | | | | | | | |
| | | | | | Receive request and select supplemental content | Transmit request for link | |
| | | | | | | | |
| Generate fifth fingerprint data and fifth metadata | Compare third fingerprint data and fifth fingerprint data | Detect a match between third fingerprint data and fifth fingerprint data | Determine modification start time and modification end time | Transmit a request for supplemental content | | | |
| | | | | | | | |
| T31 | T32 | T33 | T34 | T35 | T36 | T37 | T38 |

Figure 4E

| | | | | | | |
|---|---|---|---|---|---|---|
| T39 | | | | Transmit link | | |
| T40 | Receive link and retrieve supplemental content | | | | | |
| T41 | Perform content modification operation | | | | | |

Figure 4F

Content Presentation Device Records
700

| Content Presentation Device ID | Network speed | Hardware Processing speed | Supplemental processing time scaling factor |
|---|---|---|---|
| $CPD_1$ | 10 Mbs | 10 | 1 |
| $CPD_2$ | 100 Mbs | 8 | 2 |
| ... | ... | ... | ... |
| $CPD_N$ | 50 Mbs | 5 | 1.5 |

Fig. 7

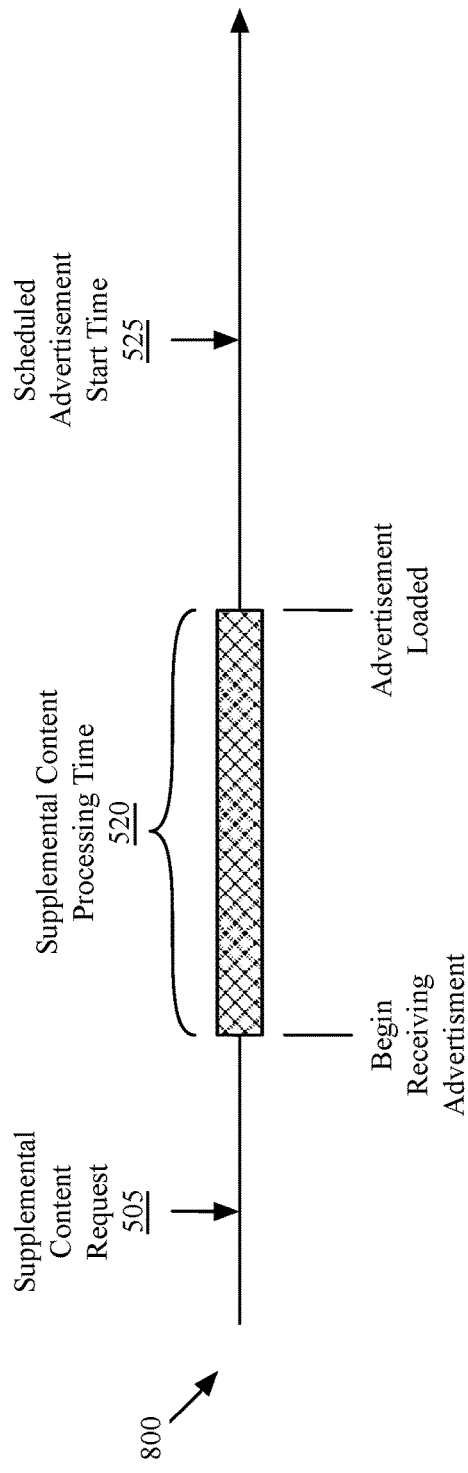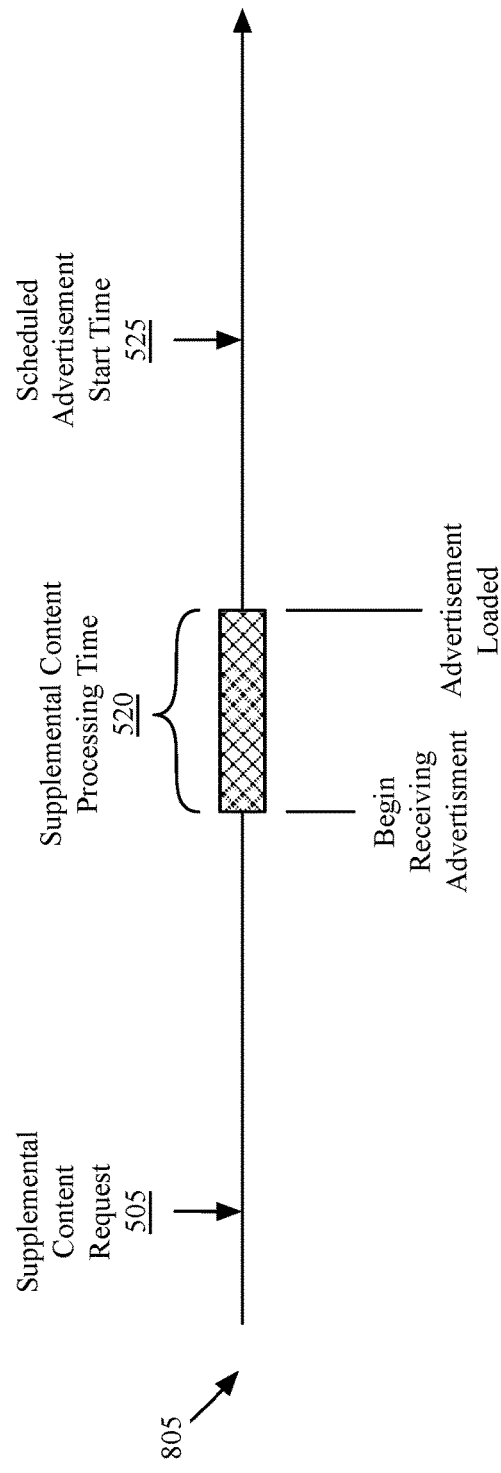
Fig. 8A
Fig. 8B

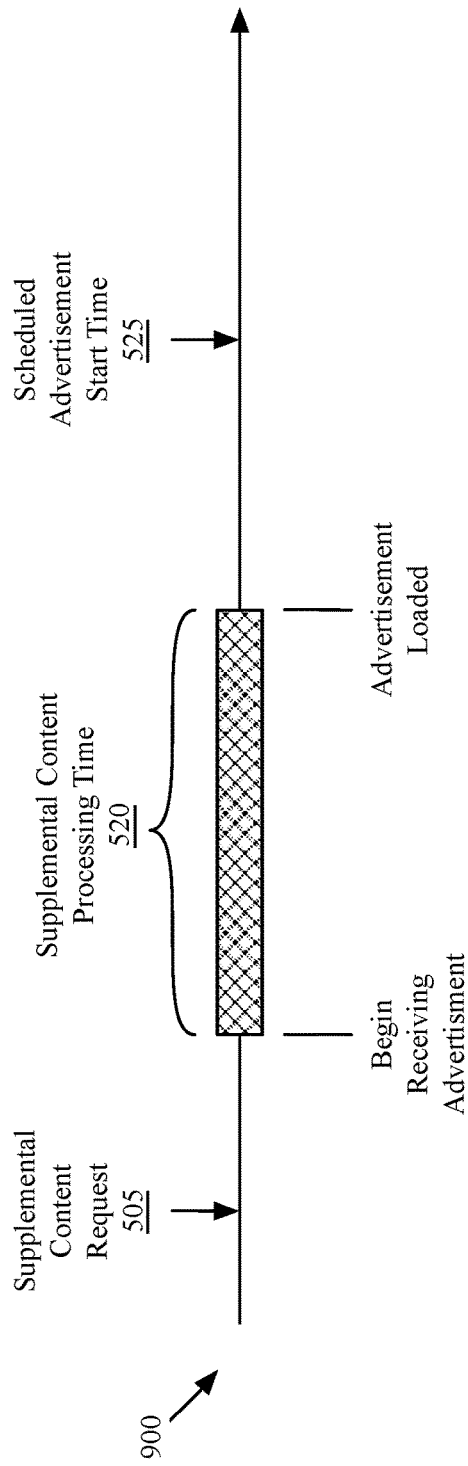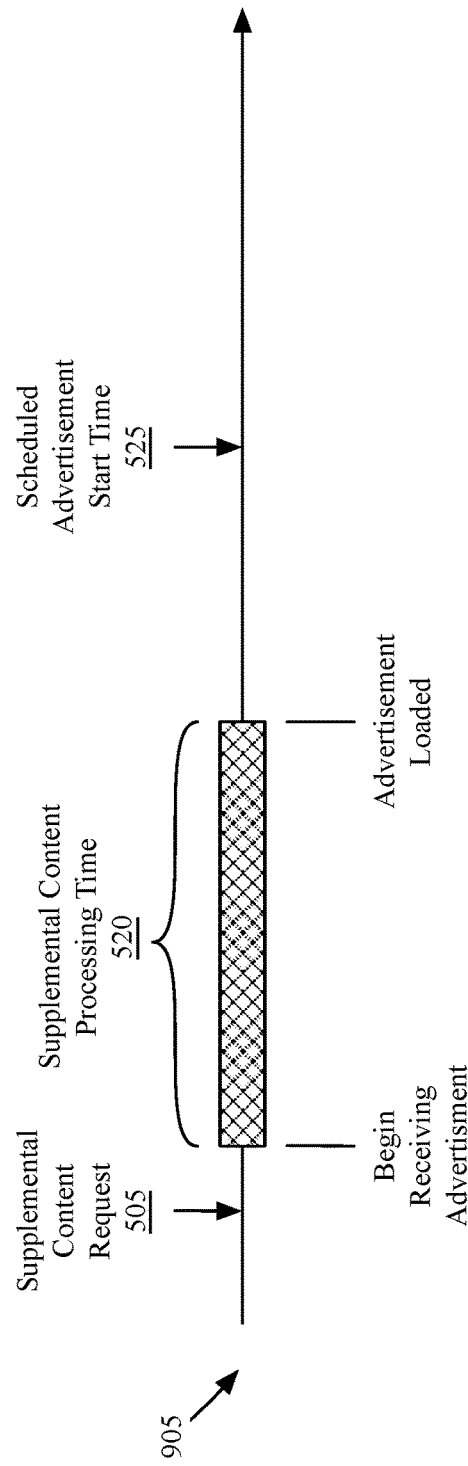
Fig. 9A
Fig. 9B

CONTENT MODIFICATION SYSTEM WITH PRIORITIZED CONTENT DELIVERY FEATURE

RELATED APPLICATIONS

This application claims the benefit of priority under 35 U.S.C. § 119(e) of U.S. Provisional Application No. 63/148,575, filed Feb. 11, 2021, the content of which is incorporated herein by reference in its entirety.

BACKGROUND

Field

This application generally relates to content modification systems. In particular, this application describes a content modification system with a prioritized content delivery feature.

Description of Related Art

Dynamic advertisement insertion (DAI) involves dynamically selecting and communicating an advertisement or other content to a user via a communication channel (e.g., television). In some cases, requests for supplemental content (e.g., replacement advertisements) are communicated from content presentation devices (e.g., TVs) to a content management system. The content management system, in turn, obtains and communicates a link associated with the supplemental content to the requesting content presentation device.

However, processing requests received from multiple content presentation devices can be time-consuming and, as a result, the processing of a particular request can be delayed to an extent. This delay may prevent the insertion of the requested supplemental content.

SUMMARY

In one aspect, a method implemented by a computing system includes receiving, from each of a plurality of content presentation devices, a request for supplemental content. Each content presentation device is configured to present program content received from a content distribution system, wherein the program content is associated with a program schedule that specifies an advertisement start time. The computing system determines, for each of the plurality of content presentation devices, a supplemental content processing time that corresponds to an amount of time required by a particular content presentation device to receive the supplemental content to facilitate presentation of the supplemental content. The computing system schedules the plurality of content presentation devices to receive requested supplemental content according to corresponding supplemental content processing times and advertisement start times. Content presentation devices having higher supplemental content processing times and earlier advertisement start times are scheduled to begin receiving requested supplemental content before content presentation devices associated with lower supplemental content processing times, and later advertisements start times. Supplemental content is subsequently communicated to the content presentation devices according to the schedule.

In another aspect, a non-transitory computer-readable storage medium has stored thereon program instructions that, upon execution by a processor, cause performance of a set of operations. The set of operations includes receiving, from each of a plurality of content presentation devices, a request for supplemental content, wherein each content presentation device is configured to present program content received from a content distribution system. The program content is associated with a program schedule that specifies an advertisement start time. The processor determines, for each of the plurality of content presentation devices, a supplemental content processing time that corresponds to an amount of time required by a particular content presentation device to receive the supplemental content to facilitate presentation of the supplemental content. The processor schedules the plurality of content presentation devices to receive requested supplemental content according to corresponding supplemental content processing times and advertisement start times. Content presentation devices having higher supplemental content processing times and earlier advertisement start times are scheduled to begin receiving requested supplemental content before content presentation devices associated with lower supplemental content processing times, and later advertisements start times. Supplemental content is subsequently communicated to the content presentation devices according to the schedule.

In another aspect, a computing system includes a processor and a non-transitory computer-readable storage medium, having stored thereon program instructions that, upon execution by the processor, cause performance of a set of operations. The set of operations includes receiving, from each of a plurality of content presentation devices, a request for supplemental content, wherein each content presentation device is configured to present program content received from a content distribution system. The program content is associated with a program schedule that specifies an advertisement start time. The processor determines, for each of the plurality of content presentation devices, a supplemental content processing time that corresponds to an amount of time required by a particular content presentation device to receive the supplemental content to facilitate presentation of the supplemental content. The processor schedules the plurality of content presentation devices to receive requested supplemental content according to corresponding supplemental content processing times and advertisement start times. Content presentation devices having higher supplemental content processing times and earlier advertisement start times are scheduled to begin receiving requested supplemental content before content presentation devices associated with lower supplemental content processing times, and later advertisements start times. Supplemental content is subsequently communicated to the content presentation devices according to the schedule.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

FIG. 7 illustrates content presentation device (CPD) records stored in a database of a content management system, in accordance with an example.

FIGS. 8A and 8B illustrate timelines associated with the scheduled communication of the same supplemental content to two content presentation devices, in accordance with an example.

FIGS. 9A and 9B illustrate timelines associated with the scheduled communication of the same supplemental content to two content presentation devices when the scheduled advertisement start times are different, in accordance with an example.

DETAILED DESCRIPTION

Figure 1:
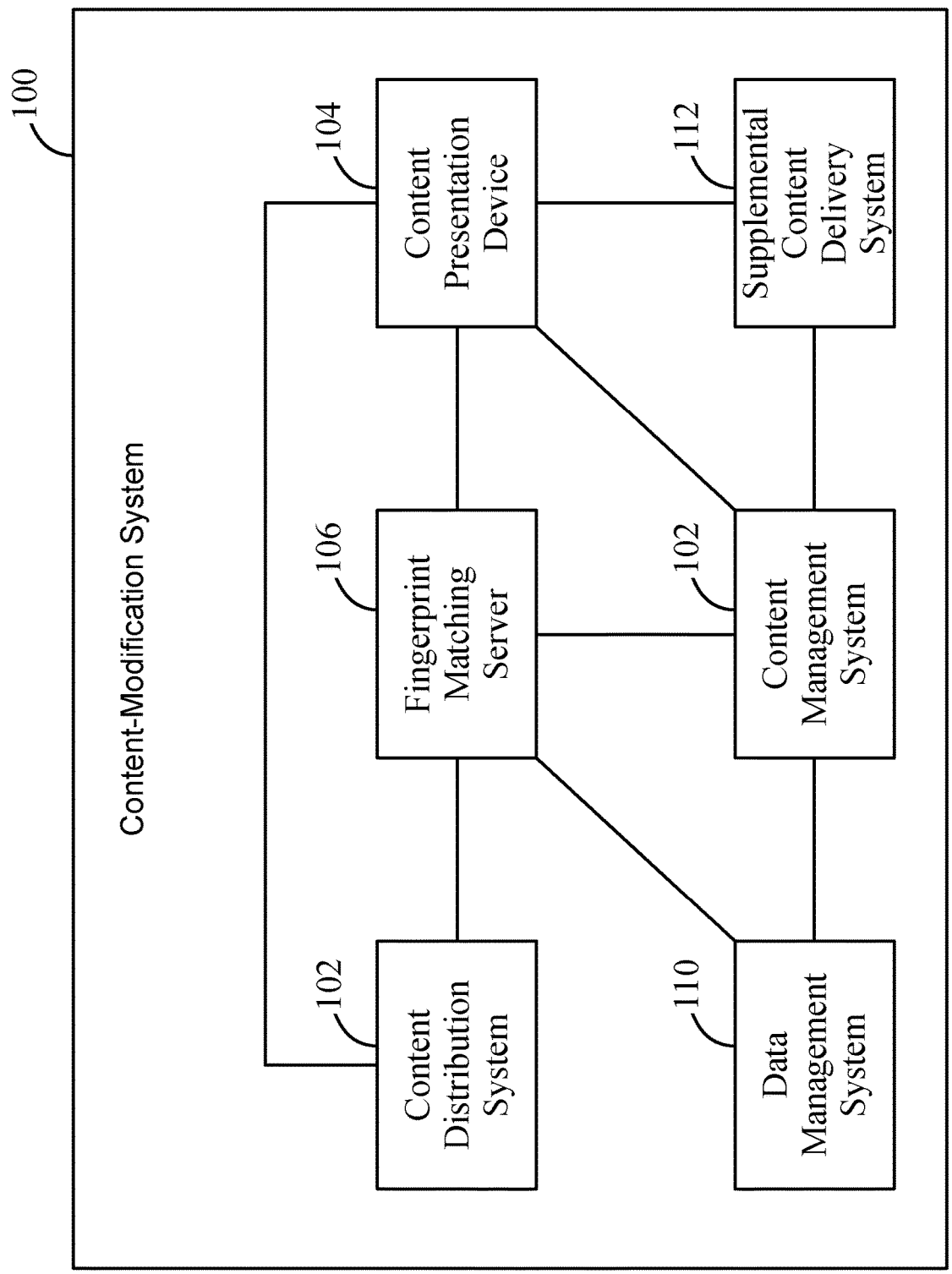
FIG. 1 is a simplified block diagram of an example content-modification system in which various described principles can be implemented.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide. Further, unless otherwise specified and/or unless the particular context clearly dictates otherwise, the terms such as "a" or "an" mean at least one, and the term "the" means the at least one.

I. OVERVIEW

To deliver and present content to end-users, a content provider can transmit the content to one or more content-distribution systems, each of which can in turn transmit the content to one or more respective content presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content presentation devices can take various forms. For instance, a content-distribution system can be associated with a cable-television provider and can transmit video content to content presentation devices of end-users who are cable-television subscribers through hybrid fiber/coaxial cable connections.

As such, in various scenarios, a content-distribution system can transmit content to a content presentation device, which can receive and output the content for presentation to an end-user. In some situations, even though the content presentation device receives content from the content-distribution system, it can be desirable for the content presentation device to perform a content-modification operation so that the content presentation device can output for presentation alternative content instead of at least a portion of that received content.

For example, in the case where the content presentation device receives a linear sequence of content segments that includes a given advertisement segment positioned somewhere within the sequence, it can be desirable for the content presentation device to replace the given advertisement segment with a different advertisement segment that is perhaps more targeted to the end-user (e.g., more targeted to the end-user's interests, demographics, etc.). As another example, it can be desirable for the content presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content presentation device data to facilitate preparing the content presentation device to perform a content-modification operation in connection with the identified upcoming content-modification opportunity.

However, in other cases, it may be desirable for the content presentation device to use one or more alternative techniques to facilitate performing a content-modification operation.

For example, the fingerprint-matching server can use broadcast-schedule data to facilitate the content presentation device performing a content-modification operation. Among other things, this can allow the content presentation device to facilitate performing a content-modification operation without using fingerprint data or by using fingerprint data in a more limited fashion. This can be beneficial in the case where the content presentation device does not receive or otherwise have access to fingerprint data, or where the use of fingerprint data is undesirable for one or more reasons (e.g., because fingerprint-based techniques may be computationally expensive).

II. ARCHITECTURE

A. Content-Modification System

FIG. 1 is a simplified block diagram of an example content-modification system 100. The content-modification system 100 can include various components, such as a content-distribution system 102, a content presentation device 104, a fingerprint-matching server 106, a content management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content presentation devices.

B. Computing System

Figure 2:
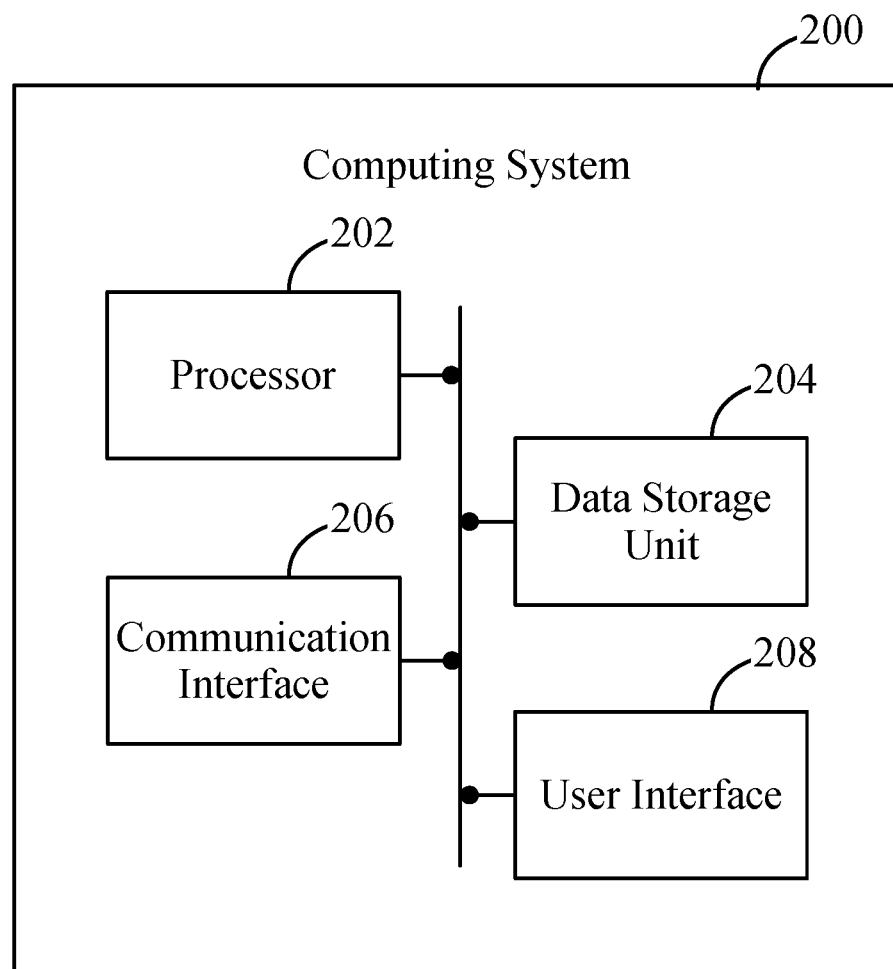
FIG. 2 is a simplified block diagram of an example computing system in which various described principles can be implemented.

FIG. 2 is a simplified block diagram of an example computing system 200. An example of the computing system 200 is configured to perform one or more operations, such as the operations described in this disclosure. An example of the computing system 200 includes various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. EXAMPLE OPERATIONS

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content presentation device 104 receiving and outputting content will now be described.

To begin, the content-distribution system 102 can transmit content (e.g., that it received from a content provider) to one or more entities such as the content presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content presentation device 104 can take various forms. By way of example, the content-distribution system 102 can be or include a cable-television head-end that is associated with a cable-television provider and that transmits the content on the channel to the content presentation device 104 through hybrid fiber/coaxial cable connections. As another example, the content-distribution system 102 can be or include a satellite-television head-end that is associated with a satellite-television provider and that transmits the content on the channel to the content presentation device 104 through a satellite transmission. As yet another example, the content-distribution system 102 can be or include a television-broadcast station that is associated with a television-broadcast provider and that transmits the content on the channel through a terrestrial over-the-air interface to the content presentation device 104. In these and other examples, the content-distribution system 102 can transmit the content in the form of an analog or digital broadcast stream representing the content.

The content presentation device 104 can receive content from one or more entities, such as the content-distribution system 102. In one example, the content presentation device 104 can select (e.g., by tuning to) a channel from among multiple available channels, perhaps based on input received via a user interface, such that the content presentation device 104 can receive content on the selected channel.

In some examples, the content-distribution system 102 can transmit content to the content presentation device 104, which the content presentation device 104 can receive, and therefore the transmitted content and the received content can be the same. However, in other examples, they can be different, such as where the content-distribution system 102 transmits content to the content presentation device 104, but the content presentation device 104 does not receive the content and instead receives different content from a different content-distribution system.

The content presentation device 104 can also output content for presentation. As noted above, the content presentation device 104 can take various forms. In one example, in the case where the content presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content presentation device 104, which can receive and output the content for presentation to an end-user. In some situations, even though the content presentation device 104 receives content from the content-distribution system 102, it can be desirable for the content presentation device 104 to perform a content-modification operation so that the content presentation device 104 can output for presentation alternative content instead of at least a portion of that received content.

For example, in the case where the content presentation device 104 receives a linear sequence of content segments that includes a given advertisement segment positioned somewhere within the sequence, it can be desirable for the content presentation device 104 to replace the given advertisement segment with a different advertisement segment that is perhaps more targeted to the end-user (i.e., more targeted to the end-user's interests, demographics, etc.). As another example, it can be desirable for the content presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content presentation device 104 can receive a linear sequence of content segments. This is referred to herein as a "receipt sequence." In line with the discussion above, the transmission sequence and the receipt sequence can be the same or they can be different.

Figure 3:
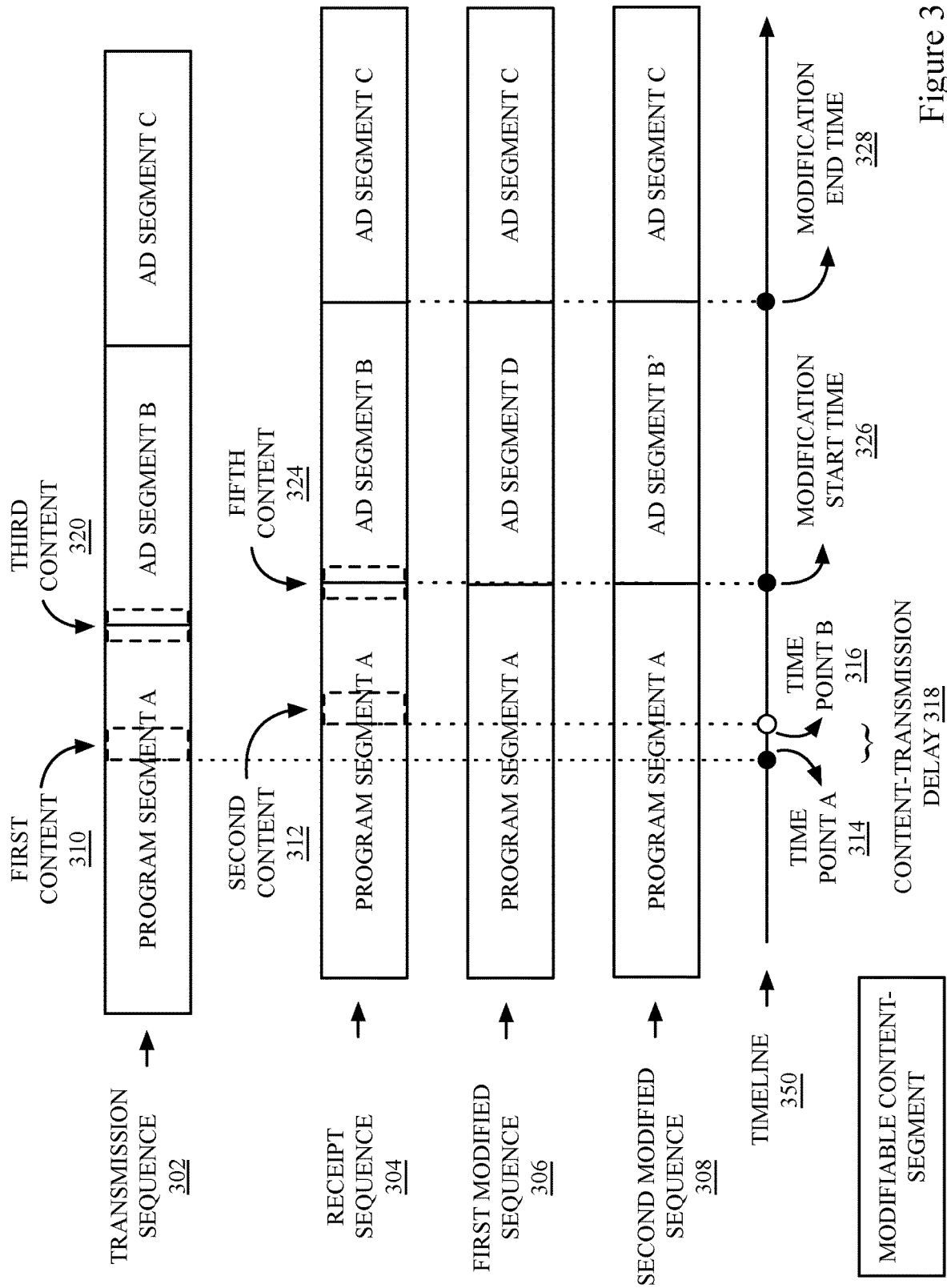
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content presentation device 104, which the content presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content presentation device 104 receives content from the content-distribution system 102, it can be desirable for the content presentation device 104 to perform a content-modification operation so that the content presentation device 104 can output for presentation alternative content instead of at least a portion of that received content. For example, in the case where the content presentation device 104 receives the receipt sequence, rather than outputting for presentation the receipt sequence, the content presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content presentation device 104 to replace the given advertisement segment with a different advertisement segment that is perhaps more targeted to the end-user (i.e., more targeted to the end-user's interests, demographics, etc.), thereby resulting in a modified sequence that the content presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content presentation device 104 to overlay on the given advertisement segment, overlay content that enhances the given advertisement segment in a way that is again perhaps more targeted to the end-user, thereby resulting in a modified sequence that the content presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content Presentation Device Receiving Second Content During a time-period T4, the content presentation device 104 can receive content from the content-distribution system 102. This content is referred to herein as "second content." In one example, the second content is the SECOND CONTENT 312 shown in FIG. 3.

During a time-period T5, the content presentation device 104 can generate fingerprint data representing the second content. This fingerprint data is referred to herein as "second fingerprint data." The content presentation device 104 can generate the second fingerprint data using any content fingerprinting process now known or later developed. The content presentation device 104 can generate the second fingerprint data at various rates, such as at the rate of one fingerprint per frame of the second content. The second fingerprint data can be or include some or all of these generated fingerprints.

The content presentation device 104 can access the second content at various points within the content presentation device 104. As one example, the content presentation device 104 can access the second content as it is being received by an input buffer (e.g., an HDMI buffer) of the content presentation device 104. In another configuration, the content presentation device 104 can access the second content as it is being received by a display buffer of the content presentation device 104. In this configuration, the second content can therefore be content that the content presentation device 104 not only receives, but also outputs for presentation.

Also during the time-period T5, the content presentation device 104 can generate metadata associated with the second content and/or the second fingerprint data. This metadata is referred to herein as "second metadata." As one example, the second metadata can be or include a receipt time-stamp, which represents a time-point at which the content presentation device 104 received the second content. The content presentation device 104 can determine the receipt time-stamp in various ways, such as based on a time clock that is synchronized to a reference clock. As noted above, the content presentation device 104 can access the second content at various points within the content presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content presentation device 104 can associate the second fingerprint data with the second metadata in various ways. For instance, where the second fingerprint data includes multiple fingerprints with each fingerprint representing a corresponding frame of second content, the content presentation device 104 can associate each second fingerprint with a corresponding receipt time-stamp and/or other corresponding metadata.

During a time-period T6, the content presentation device 104 can transmit the second fingerprint data and the second metadata to the fingerprint-matching server 106. The content presentation device 104 can transmit the second fingerprint data and the second metadata at a given interval. For example, every two seconds, the content presentation device 104 can transmit the second fingerprint data and the second metadata that it generated during that most recent two-second time-period.

D. Operations Related to Identifying a Channel on which the Content Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content presentation device 104. As noted above, the second fingerprint data represents the second content received by the content presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content presentation device 104. In one example, the fingerprint-matching server 106 can identify the channel based on the channel identifier metadata associated with the first fingerprint data used to detect the match.

Notably, in practice, since there are likely to be multiple potential channels on which the content presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content presentation device 104 that is receiving content on the identified channel. The fingerprint-matching server 106 can determine the device identifier in various ways, such as by receiving it from the content presentation device 104. In another example, the fingerprint-matching server 106 can receive data (e.g., device registration data) from the content presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content presentation device 104 has received content on the identified channel, what specific content the content presentation device 104 has received, etc. This type of data is referred to herein as "historical content consumption data."

As such, during a time-period T15, the data-management system 110 can determine historical content consumption data associated with the content presentation device 104.

F. Operations Related to the Content-Distribution System Transmitting Third Content As noted above, the fingerprint-matching server 106 can identify the channel on which the content presentation device 104 is receiving the second content.

During a time-period T16, the content-distribution system 102 can transmit content on the identified channel to the content presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content Management System Receiving a Modifiable Content-Segment During a time-period T19, the content management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content management system 108, such that the content management system 108 can receive it in this way.

During a time-period T20, the content management system 108 can generate fingerprint data representing the modifiable content-segment. This fingerprint data is referred to herein as "fourth fingerprint data." The content management system 108 can generate the fourth fingerprint data using any fingerprint generation technique now known or later developed. The content management system 108 can generate the fourth fingerprint data at a given rate, such as at the rate of one fingerprint per frame of the fourth content. The fourth fingerprint data can be or include some or all of these generated fingerprints.

Also during the time-period T20, the content management system 108 can generate metadata associated with the modifiable content-segment and/or the fourth fingerprint data. This metadata is referred to herein as "fourth metadata." As one example, the fourth metadata can be or include a duration of the modifiable content-segment. The content management system 108 can determine the duration in various ways, such as based on the fingerprint generation process. For example, in the case where the content management system 108 generating the fourth fingerprint data involves generating one fingerprint per frame, where the modifiable content-segment has a frame rate of 30 frames per second, and where the fingerprinting process results in 300 fingerprints being generated, the content management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content management system 108 can transmit the fourth fingerprint data and the fourth metadata to the fingerprint-matching server 106.

In practice, the content management system 108 is likely to receive many modifiable content-segments. In such situations, the content management system 108 can perform one or more of the operations described above, as appropriate for each of the many received modifiable content-segments. As such, the content management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content presentation device 104 data to facilitate preparing the content presentation device 104 to perform a content-modification operation in connection with the identified upcoming content-modification opportunity.

During a time-period T28, the content presentation device 104 can receive the third fingerprint data and the third metadata from the fingerprint-matching server 106.

During a time-period T29, the content presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content presentation device 104 can receive the third fingerprint data and the third metadata from the fingerprint-matching server 106 before receiving the fifth content from the content-distribution system 102. In this way, the content presentation device 104 can receive fingerprint data representing content that the content presentation device 104 is expecting to receive shortly thereafter, and that the content presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content presentation device 104 is likely to receive the fifth content shortly after (e.g., immediately after or a few seconds or minutes after) receiving the second content.

During a time-period T30, the content presentation device 104 can output for presentation at least a portion of the fifth content. For example, referring to FIG. 3, the content presentation device can output for presentation the portion of the FIFTH CONTENT 324 that is the end portion of the PROGRAM SEGMENT A.

As noted above, in some situations, even though the content presentation device 104 receives content from the content-distribution system 102, it can be desirable for the content presentation device 104 to perform a content-modification operation so that the content presentation device 104 can output for presentation alternative content instead of at least a portion of the received content.

As such, even though the content presentation device 104 receives the fifth content and outputs for presentation at least a portion of the fifth content, it can be desirable for the content presentation device 104 to perform a content-modification operation so that the content presentation device 104 can also output for presentation alternative content instead of at least another portion (e.g., the remaining portion) of the fifth content. For example, referring to FIG. 3, it can be desirable for the content presentation device 104 to replace at least a portion of the AD SEGMENT B with at least a portion of a different advertisement segment that is perhaps more targeted to the end-user. As another example, it can be desirable for the content presentation device 104 to overlay on at least a portion of the AD SEGMENT B, overlay content that enhances at least a portion of the AD SEGMENT B in a way that is again perhaps more targeted to the end-user.

During a time-period T31, the content presentation device 104 can generate fingerprint data representing the fifth content. This fingerprint data is referred to herein as "fifth fingerprint data." The content presentation device 104 can generate the fifth fingerprint data using any content fingerprinting process now known or later developed. The content presentation device 104 can generate the fifth fingerprint data at various rates, such as at the rate of one fingerprint per frame of the fifth content. The fifth fingerprint data can be or include some or all of these generated fingerprints.

Also during the time-period T31, the content presentation device 104 can generate metadata associated with the fifth content and/or the fifth fingerprint data. This metadata is referred to herein as "fifth metadata."

The content presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content presentation device 104 can receive the third fingerprint data from the fingerprint-matching server 106 and can generate the fifth fingerprint data.

During a time-period T32, the content presentation device 104 can compare the third fingerprint data and the fifth fingerprint data to determine whether there is a match.

During a time-period T33, based on the comparing, the content presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content presentation device 104 on the same identified channel, is referred to herein as a "hot match attempt." The content presentation device 104 can compare and/or detect a match between fingerprint data using any content fingerprint comparing and matching process now known or later developed.

During a time-period T34, based on the detected match, the content presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content presentation device 104 can then determine the modification start-time by determining a time-period between (i) a current receipt time-stamp associated with a first portion of the fifth content that the content presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content presentation device 104 performs a hot match attempt and does not detect a match, the content presentation device 104 can determine that the content presentation device 104 is no longer receiving content on the most recently identified channel. In response, the content presentation device 104 can repeat one or more of the operations described above so that the fingerprint-matching server 106 can perform another cold match attempt, to attempt to identify the channel again.

During a time-period T35, the content presentation device 104 can transmit a request for content for use in connection with performing the content-modification operation, to the content management system 108. This content is referred to herein as "supplemental content." In one example, the content presentation device 104 can transmit the request before the modification start-time (e.g., ten seconds before). In some cases, the request can include selection criteria for the supplemental content, which the content presentation device 104 can determine based on the third metadata that the content presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content management system 108 can receive the request and use it as a basis to select supplemental content from among multiple supplemental content items that are available for selection. In some cases, the content management system 108 can receive and consider various data to help inform which supplemental content to select. For example, the content management system 108 can receive historical content consumption data for the content presentation device 104 from the data-management system 110 and/or the content management system 108 can receive demographic data from a demographic data provider. The content management system 108 can then use at least the received historical content consumption data and/or the received demographic data as a basis to select the supplemental content.

The content management system 108 can cause the selected supplemental content to be transmitted to the content presentation device 104. In one example, the content management system 108 can do this by communicating with a supplemental-content delivery system 112 that can host the supplemental content. The supplemental-content delivery system 112 can take various forms and can include various components, such as a content distribution network (CDN).

During a time-period T37, the content management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content management system 108.

During a time-period T39, the content management system 108 can then in turn transmit the link to the content presentation device 104.

During a time-period T40, the content presentation device 104 can receive the link, which it can use to retrieve the supplemental content from the supplemental-content delivery system 112, such that the content presentation device 104 can use the retrieved supplemental content in connection with performing the content-modification operation. In one example, the content presentation device 104 can retrieve the supplemental content and store the supplemental content in a data-storage unit of the content presentation device 104.

As such, in some examples, the content presentation device 104 can receive the modifiable content-segment from one source (e.g., the content-distribution system 102), and the supplemental content from another source (e.g., the supplemental-content delivery system 112). These segments can be transmitted to, and received by, the content presentation device 104 in different ways. For example, the content-distribution system 102 can transmit, and the content presentation device 104 can receive, the modifiable content-segment as a broadcast stream transmission, whereas the supplemental-content delivery system 112 can transmit, and the content presentation device 104 can receive, the supplemental content as an over-the-top (OTT) transmission. In this context, in one example, the content-distribution system 102 can receive the modifiable content-segment via one communication interface (e.g., an HDMI interface), and the content presentation device 104 can receive the supplemental content via a different communication interface (e.g., an Ethernet or WI-FI interface).

J. Operations Related to the Content Presentation Device Performing a Content-Modification Operation At a time-period T41, the content presentation device 104 can perform the content-modification operation. The content presentation device 104 can do this in various ways, perhaps depending on the type of content-modification operation to be performed.

In one example, the content presentation device 104 performing a content-modification operation can involve the content presentation device 104 modifying the modifiable content-segment by replacing it with supplemental content. This is referred to herein as a "content-replacement operation." For example, in this scenario, the content presentation device 104 can receive a linear sequence of content segments that includes the modifiable content-segment and the associated metadata, and can also receive the supplemental content segment, as described above. The content presentation device 104 can output for presentation the sequence of content segments up until the modification start-time (which corresponds to the start of the modifiable content-segment), at which time the content presentation device 104 can switch to outputting for presentation the supplemental content instead. Then, at the modification end-time (which corresponds to the end of the modifiable content-segment), the content presentation device 104 can switch back to outputting for presentation the content that follows in the linear sequence of content segments (or perhaps to other content, such as additional supplemental content that is replacing another modifiable content-segment).

In one example, the operation of the content presentation device 104 switching from outputting the sequence of content segments to outputting the supplemental content can involve using various buffers of the content presentation device 104. For example, this can involve the content presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content presentation device 104 can replace the AD SEGMENT B with the AD SEGMENT D. As a result, rather than outputting for presentation the RECEIPT SEQUENCE 304, the content presentation device can instead output for presentation the FIRST MODIFIED SEQUENCE 306.

In another example, the content presentation device 104 performing a content-modification operation can involve the content presentation device 104 modifying a modifiable content-segment by overlaying on the modifiable content-segment, overlay content (referred to herein as a "content overlay operation"). For example, in this scenario, the content presentation device 104 can again receive a linear sequence of content segments that includes the modifiable content-segment and the associated metadata, and the content presentation device 104 can also receive the supplemental content, as described above.

The content presentation device 104 can then output for presentation the modifiable content-segment as it ordinarily would, except that starting at the modification start-time, the content presentation device 104 can start overlaying the supplemental content on the modifiable content-segment. The content presentation device 104 can continue overlaying the supplemental content until the modification end-time. In this way, the content presentation device 104 can overlay the supplemental content during at least some temporal portion of the modifiable content-segment.

In one example, the operation of the content presentation device 104 overlaying supplemental content on the modifiable content-segment can involve using various buffers of the content presentation device 104. For example, this can involve the content presentation device 104 using a portion of first data in a first input buffer where the sequence of content segments is being received together with second data in a second input buffer where the supplemental content is being received, for the purposes of populating a display buffer. In this way, the content presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content presentation device 104 can overlay supplemental content on the AD SEGMENT B, thereby modifying it to AD SEGMENT B'. As a result, rather than outputting for presentation the RECEIPT SEQUENCE 304, the content presentation device can instead output for presentation the SECOND MODIFIED SEQUENCE 308.

In some examples, the content presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content presentation device 104 and/or associated display device. Thus, the FIRST MODIFIED SEQUENCE 306 or the SECOND MODIFIED SEQUENCE 308 can be output on the same channel on which the content presentation device 104 is tuned—that is, the channel on which the modifiable content-segment is received and on which the content-modification opportunity was identified.

K. Tracking and Reporting Operation-Related Data

To help facilitate performance of various operations such as the content presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content presentation device 104, the content-distribution system 102 or another entity can insert a channel identifier in the form of a watermark into the second content, such that the fingerprint-matching server 106, the content presentation device 104, or another entity can extract the channel identifier and use it to identify the channel on which the second content is being received by the content presentation device 104.

In this context, the content-modification system 100 can employ any watermark technique now known or later developed.

M. Operations Related to the Prioritization of the Delivery of Supplemental Content.

Aspects related to the prioritization of the delivery of supplemental content to one or more content presentation devices 104 are described in FIGS. 5-11B. As noted above, in some examples of dynamic advertisement insertion (DAI) systems, requests for supplemental content (e.g., replacement advertisements) are communicated from content presentation devices 104 (e.g., TV's) to a content management system 108. The content management system 108 obtains a link to the supplemental content from a supplemental content delivery system 112. Processing these requests on the systems required to facilitate the delivery of the supplemental content can be time-consuming. Generally, content presentation devices 104 need as much time as possible to download supplemental content to improve the chances that all the supplemental content is downloaded in time for the replacement to happen. Simply processing the supplemental content requests as they arrive (e.g., first in, first out) is suboptimal as some requests can take longer than other requests to process. The operations described below facilitate prioritizing these requests based on various factors to mitigate some of these aspects.

Figure 5:
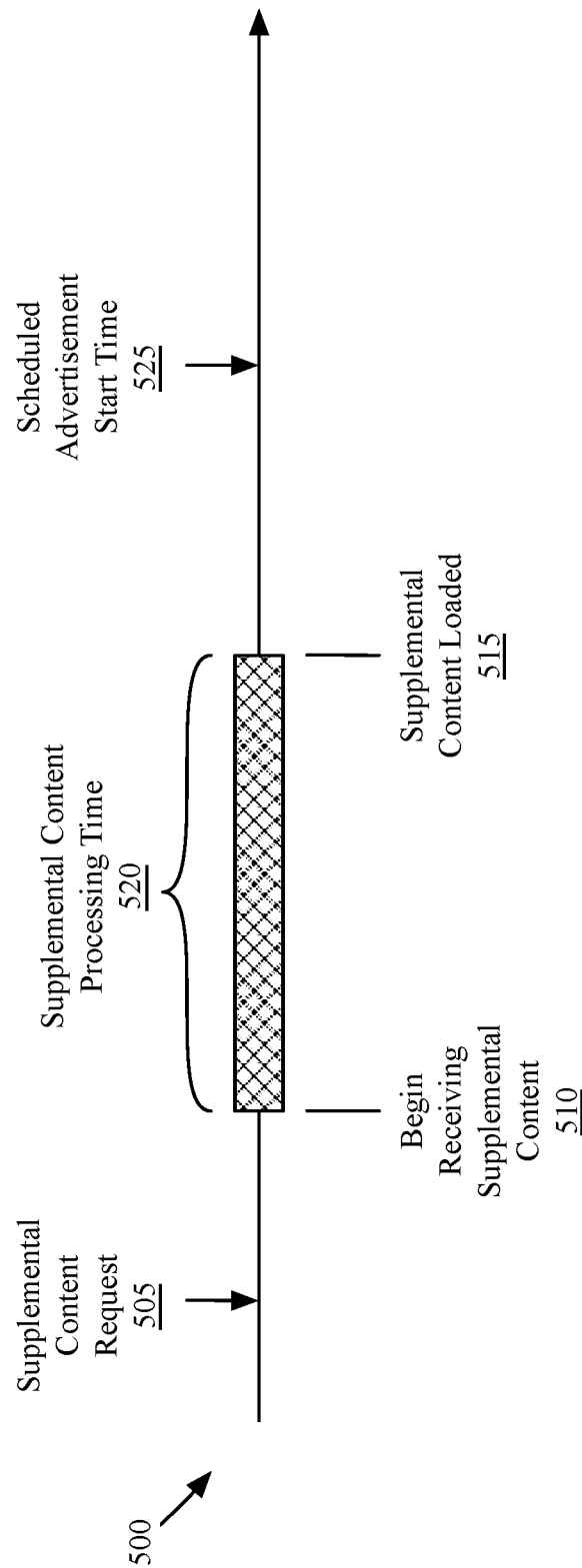
FIG. 5 illustrates a timeline of operations performed in obtaining supplemental content for presentation, in accordance with an example.

FIG. 5 illustrates an example of a timeline 500 of operations performed in obtaining supplemental content for presentation. The timeline 500 facilitates a better understanding of prioritization operations that are described below. In the timeline 500, the operations begin with a supplemental content request 505 that is communicated from the content presentation device 104. For instance, and as described above, in an example, at time-period T35, the content presentation device 104 communicates a request for supplemental content for use in connection with performing a content-modification operation to the content management system 108. In one example, the content presentation device 104 transmits the request before the modification start-time (e.g., five minutes before, ten seconds before, etc.).

At a later time 510, the content presentation device 104 begins receiving supplemental content, and at yet a later time 515, the supplemental content is loaded and ready for presentation. The total time for performing these operations corresponds to the supplemental content processing time 520. In operation, after the supplemental content is loaded, the supplemental content is presented at the scheduled advertisement start time 525.

Figure 6:
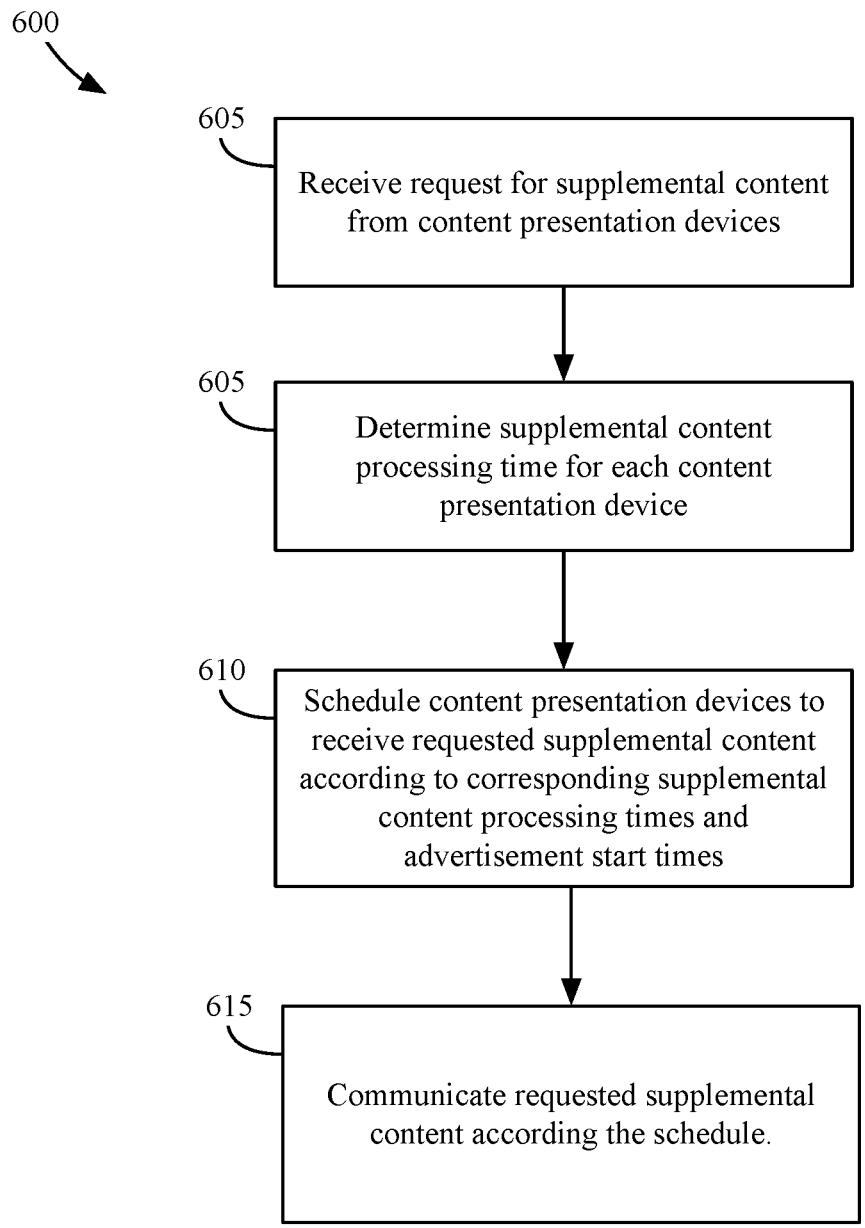
FIG. 6 illustrates operations that facilitate prioritization of the delivery of supplemental content to one or more content presentation devices, in accordance with an example.

FIG. 6 illustrates examples of operations 600 that facilitate prioritization of the delivery of supplemental content to one or more content presentation devices 104. At block 605, requests for supplemental content are received from content presentation devices 104. For example, the supplemental content requests 505 are received from one or more content presentation devices 104, as described above.

At block 605, the supplemental content processing time 520 for each content presentation device 104 is determined. The supplemental content processing time 520 is affected by various factors. For instance, the network speed of the network through which the content presentation device 104 downloads content affects the supplemental content processing time 520. The processing power of the content presentation device 104 affects the supplemental content processing time 520.

In some examples, the content presentation device 104 provides information to the content processing system 108 that facilitates determining the supplemental content processing time 520. For instance, an example of the content presentation device 104 communicates hardware information (e.g., processor type, operating system, memory space, etc.) that facilitates determining the supplemental content processing time 520. An example of the content presentation device 104 is configured to perform a network speed test that facilitates determining the network speed associated with the content presentation device 104. The results of the network speed test are communicated to the content processing system 108. The content presentation device 108 may perform the speed test periodically, such as every day, hour, etc., and report the results accordingly. In some examples, the content management system 108 communicates an instruction to the content presentation device 104 to control the content presentation device 104 to perform the network speed test and/or to provide, for example, the hardware information described above. In some examples, the content management system 108 includes a database (See FIG. 7) that stores information that facilitates determining the supplemental content processing time 520.

At block 610, the content presentation devices 104 are scheduled to receive requested supplemental content according to corresponding supplemental content processing times 520 and advertisement start times 525. For instance, an example of the content management system 108 generates a schedule that specifies times at which links to supplemental content are to be communicated. In some examples, the content management system 108 determines fingerprints in program content being presented by the content presentation devices 104 that correspond to the specified times. In other examples, the content management system 108 prioritizes the order in which it communicate the links. For example, the content management system 108 may communicate links to content presentation devices 104 associated with the highest content processing times 520 before communicating links to content presentation devices 104 associated with the lower content processing times 520.

In some examples, the content management system 108 determines, based on the supplemental content processing time and the advertisement start time, that a particular request for supplemental content cannot be delivered before the scheduled advertisement start time. In this case, the content management system 108 determines that the supplemental content cannot be delivered before the scheduled advertisement start time and may not schedule delivery of supplemental content and, therefore, cancel the particular request.

And at block 615, the requested supplemental content is communicated to the content presentation devices 104 according to the schedule. For instance, in an example, links to supplemental content are communicated to the content presentation devices 104 with the expectation that the content presentation devices 104 will begin to download the content proximate to when the links are received. In another example, the fingerprints described above are communicated to the content presentation devices along with the links to the supplemental content. In these examples, the content presentation devices 104 begin to download the supplement content associated with the link when the program content being presented matches the fingerprint.

FIG. 7 illustrates an example of content presentation device (CPD) records 700 stored in the database described above. In an example, the CPD records 700 include a CPD ID field, a network speed field, a hardware processing speed field, and a supplemental processing time scaling factor (SPTSF) field. An example of a CPD ID field specifies information (e.g., a randomly assigned value, a hash associated with the content presentation device) that uniquely identifies a content presentation device. An example of the network speed field specifies the network speed associated with a particular content presentation device 104. An example of the network speed is specified in terms of the network bit rate (e.g., 10 Mbs). In some examples, network latency is specified (e.g., 50 ms ping time).

An example of hardware processing speed field specifies a value indicative of the processing speed of the content presentation device 104. The processing speed may be related to aspects of the content presentation device 104, such as the processor type, operating system, memory space, etc. In an example, the processing speed is specified in relative terms such as 10 to indicate that the content presentation has very high processing capabilities (e.g., fast processor, excess memory, most up-to-date operating system) and zero to indicate that the content presentation device 104 has very low processing capabilities (e.g., slow processor, little memory available, outdated operating system, etc.). Some examples of the content management system 108 include a lookup table that associates hardware processing speed values with different combinations of processor types, memory amounts, operating systems, etc.

An example of the SPTSF field specifies a value used by the content processing system 108 to determine the supplemental processing time associated with the processing of particular supplemental content. In an example, the SPTSF is generated based on the network speed and the hardware processing speed and indicates the relative speed at which the content presentation device 104 can download and process supplemental content. In an example, the lower the value, the faster the processing. In an example, the content processing system 108 determines the supplemental processing time as the product of the size of the supplemental content file and the SPTSF value. For example, a content presentation device 104 associated with an SPTSF value of two may take twice as long to download content of a particular size as a content presentation device 104 associated with an SPTSF value of one.

FIGS. 8A and 8B illustrate timelines 800, 805 associated with the scheduled communication of the same supplemental content to two content presentation devices 104. The content presentation device 104 associated with the first timeline 800 is assumed to have a higher SPTSF than the content presentation device 104 associated with the second timeline 805. For example, the network speed, processor, etc., of the first content presentation device 104 may be slower than the network speed, processor, etc., of the second content presentation device. In operation, this means that the second content presentation device 104 can download and process supplemental content of a particular size faster than the first content presentation device.

In the figures, the file size associated with the supplement content and the scheduled advertisement start times are assumed to be the same. Under these circumstances, an example of the content processing system schedules the first content presentation device 104 to begin receiving the supplemental content before the second content presentation device, as shown.

FIGS. 9A and 9B illustrate timelines 900, 905 associated with the scheduled communication of the same supplemental content to two content presentation devices 104 when the scheduled advertisement start times are different. In this example, the two content presentation devices 104 are assumed to have the same SPTSF, meaning that the two have similar network speeds, processors, etc. In operation, this means that the first content presentation device 104 and second content presentation device 104 require about the same amount of time to download and process supplemental content.

As shown, the scheduled advertisement start time in the second timeline 905 occurs sooner than the scheduled advertisement start time in the first timeline 900. Under these circumstances, an example of the content processing system 108 schedules the second content presentation device 104 to begin receiving the supplemental content before the first content presentation device, as shown.

Figure 10:
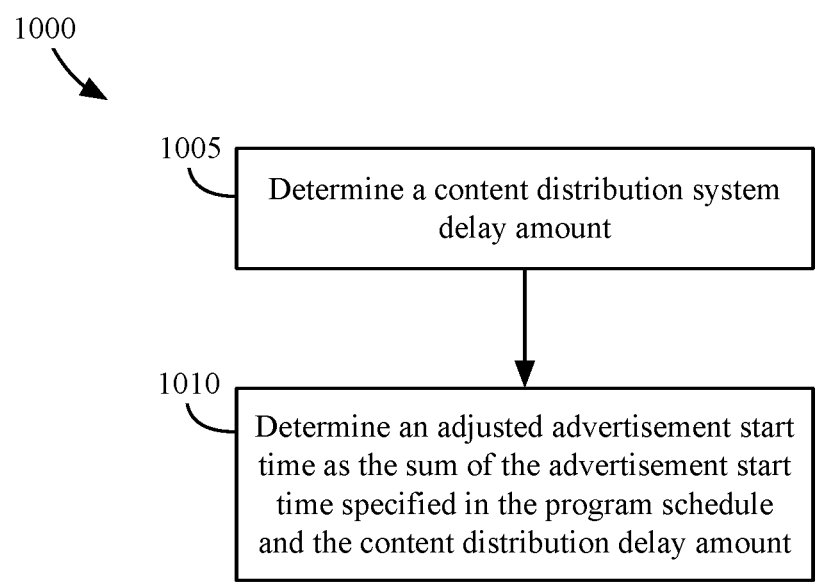
FIG. 10 illustrates variations of the operations described in FIG. 6 with respect to scheduling aspects related to the advertisement start times, in accordance with an example.

FIG. 10 illustrates variations of the operations described in FIG. 6 with respect to scheduling aspects related to the advertisement start times. At block 1005, a content distribution system delay is determined. The content distribution system delay corresponds to the difference between the advertisement start time specified in the program schedule and an actual time at which a corresponding advertisement will be presented on the content presentation device 104. For example, certain content distribution systems such as satellite-based distribution systems can introduce significant delays when broadcasting content (e.g., 10 seconds, 20 seconds, etc.). In these cases, the scheduled advertisement start times won't match the actual advertisement start times experienced by the end-user via the content presentation device 104. Some examples of the content management system 108 store content distribution system delays associated with various content distribution systems and apply the corresponding delays when determining that a particular content presentation device 104 is receiving program content from a particular content distribution system.

At block 1010, an adjusted advertisement start time is determined. The adjusted advertisement start time corresponds to the sum of the advertisement start time specified in the program schedule and the content distribution delay. In these examples, the adjusted advertisement start time is used in operation 610 to facilitate scheduling rather than the advertisement start time specified in the program schedule. The added delay facilitates delaying the time at which the corresponding content presentation device 104 receives the supplemental content.

Figure 11A:
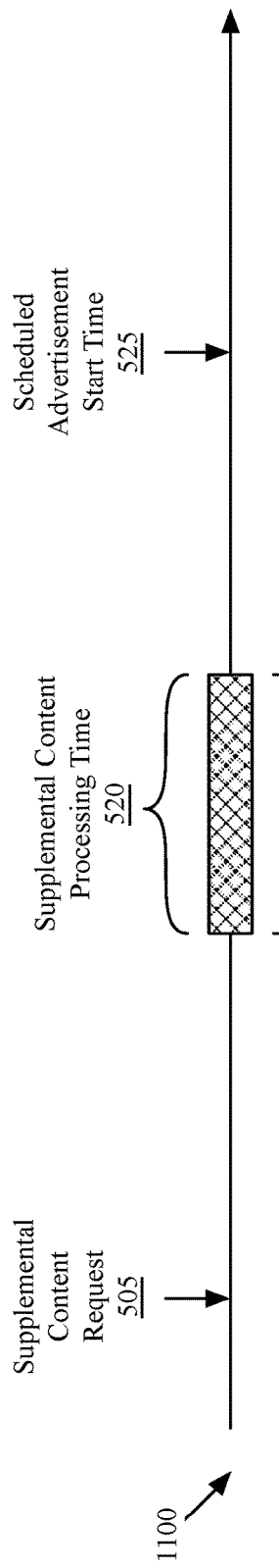
FIGS. 11A and 11B illustrate timelines that exemplify the aspects in FIG. 10, in accordance with an example.
Figure 11B:
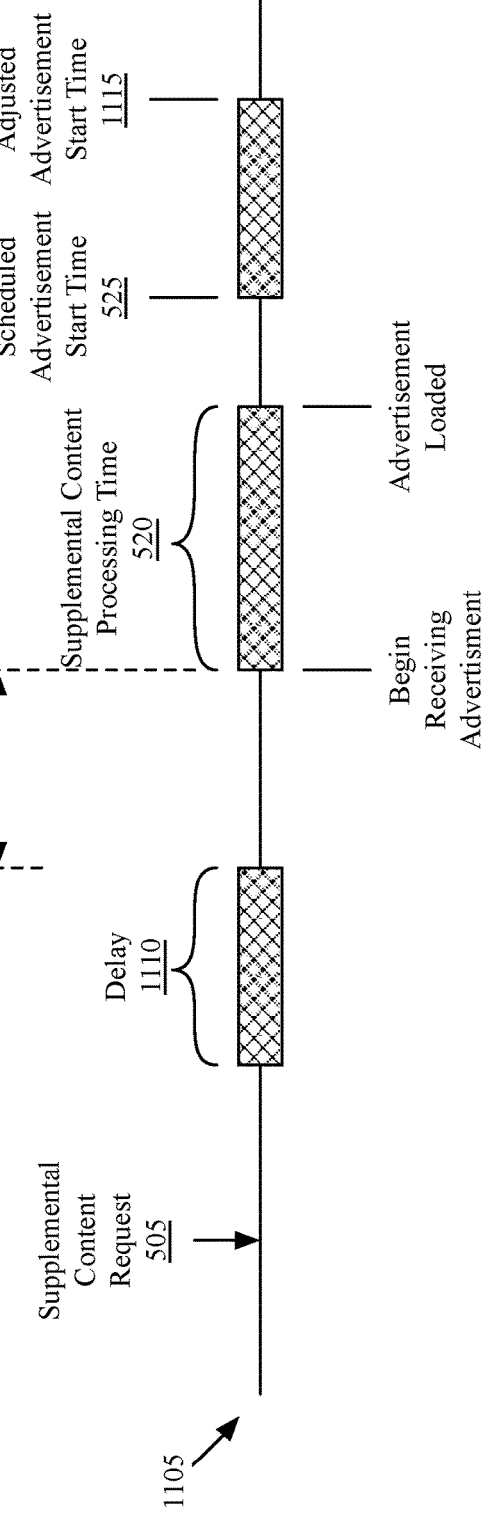

FIGS. 11A and 11B illustrate timelines 1100, 1105 that exemplify the aspects in FIG. 10. Content communicated on the first timeline 1100 does not incur any content distribution system delay. Content communicated on the second timeline 1105 does incur content distribution system delay 1110. The content distribution system delay 1110 results in a corresponding shift in time of the scheduled advertisement start time 525 to the adjusted advertisement start time 1115. As a result, the content presentation device 104 associated with the second timeline 1105 has more time available than the content presentation device 104 associated with the first timeline 110 to receive and process supplemental content. Under these circumstances, the content management system 108 adjusts the scheduling of the communication of the supplemental content so that the first content presentation device 104 begins receiving supplemental content before the second content presentation device 104

While the delay above is attributed to content distribution system delay, the delay can, in other examples, be attributed to other factors. For instance, in an example, the delay is associated with a pause operation. Therefore, an example of the content management system 108 is configured to determine the occurrence of a pause operation on a particular content presentation device 104, during which program presentation is paused and the duration of the pause operation. An example of the content management system 108 determines that the content is paused via fingerprints received from the content presentation device 104. In some examples, the content presentation device 104 is configured to communicate an indication of a pause operation and a resume operation to the content management system 108 to facilitate determining, by the content management system 108, the time and duration of the pause.

After determining, the time and duration of the pause operation, the content management system 108 determines an adjusted advertisement start time 1115 as the sum of the advertisement start time specified in the program schedule and the duration of the pause operation. In these examples, the adjusted advertisement start time 1115 is used in operation 610 to facilitate scheduling rather than the advertisement start time 525 specified in the program schedule.

IV. EXAMPLE VARIATIONS

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content presentation devices 104, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well, and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method implemented by a computing system, the method comprising:
   receiving, from each of a plurality of content presentation devices, a request for supplemental content, wherein each content presentation device is configured to present program content received from a content distribution system, wherein the program content is associated with a program schedule that specifies an advertisement start time;
   determining, by the computing system and for each of the plurality of content presentation devices, a supplemental content processing time that corresponds to an amount of time required by a particular content presentation device to receive the supplemental content to facilitate presentation of the supplemental content;
   scheduling, by the computing system, the plurality of content presentation devices to receive requested supplemental content according to corresponding supplemental content processing times and advertisement start times, wherein content presentation devices having higher supplemental content processing times and earlier advertisement start times are scheduled to begin receiving requested supplemental content before content presentation devices associated with lower supplemental content processing times and later advertisements start times; and
   communicating requested supplemental content according to the schedule.

2. The method according to claim 1, wherein determining the supplemental content processing time comprises:
   determining a network speed for a content presentation device.

3. The method according to claim 2, wherein the content presentation device is configured to determine the network speed and communicate the network speed in the request.

4. The method according to claim 1, further comprising:
   determining a content distribution system delay that corresponds to a difference between the advertisement start time specified in the program schedule and an actual time at which a corresponding advertisement will be presented on the content presentation device; and
   determining an adjusted advertisement start time as a sum of the advertisement start time specified in the program schedule and the content distribution delay;
   wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

5. The method according to claim 1, further comprising:
   determining an occurrence of a pause operation on a particular content presentation device during which program presentation is paused, and a duration of the pause operation; and
   determining an adjusted advertisement start time as a sum of the advertisement start time specified in the program schedule and the duration of the pause operation;
   wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

6. The method according to claim 1, further comprising:
   determining, by the computing system and based on the supplemental content processing time and the advertisement start time, that a particular request for supplemental content cannot be delivered before the scheduled advertisement start time; and
   responsive to determining that the supplemental content cannot be delivered before the scheduled advertisement start time, canceling the particular request.

7. The method according to claim 1, wherein the supplemental content corresponds to a replacement advertisement to replace an advertisement communicated in the program content.

8. A non-transitory computer-readable storage medium, having stored thereon program instructions that, upon execution by a processor, cause performance of a set of operations comprising:
- receiving, from each of a plurality of content presentation devices, a request for supplemental content, wherein each content presentation device is configured to present program content received from a content distribution system, wherein the program content is associated with a program schedule that specifies an advertisement start time;
- determining, by the processor and for each of the plurality of content presentation devices, a supplemental content processing time that corresponds to an amount of time required by a particular content presentation device to receive the supplemental content to facilitate presentation of the supplemental content;
- scheduling, by the processor, the plurality of content presentation devices to receive requested supplemental content according to corresponding supplemental content processing times and advertisement start times, wherein content presentation devices having higher supplemental content processing times and earlier advertisement start times are scheduled to begin receiving requested supplemental content before content presentation devices associated with lower supplemental content processing times and later advertisements start times; and
- communicating requested supplemental content according to the schedule.

9. The non-transitory computer-readable storage medium according to claim 8, wherein determining the supplemental content processing time comprises:
- determining a network speed for a content presentation device.

10. The non-transitory computer-readable storage medium according to claim 9, wherein the content presentation device is configured to determine the network speed and communicate the network speed in the request.

11. The non-transitory computer-readable storage medium according to claim 8, wherein the set of operations further comprise:
- determining a content distribution system delay that corresponds to a difference between the advertisement start time specified in the program schedule and an actual time at which a corresponding advertisement will be presented on the content presentation device; and
- determining an adjusted advertisement start time as a sum of the advertisement start time specified in the program schedule and the content distribution delay;
- wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

12. The non-transitory computer-readable storage medium according to claim 8, wherein the set of operations further comprise:
- determining an occurrence of a pause operation on a particular content presentation device during which program presentation is paused, and a duration of the pause operation; and
- determining an adjusted advertisement start time as a sum of the advertisement start time specified in the program schedule and the duration of the pause operation;
- wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

13. The non-transitory computer-readable storage medium according to claim 8, wherein the set of operations further comprise:
- determining, by the processor and based on the supplemental content processing time and the advertisement start time, that a particular request for supplemental content cannot be delivered before the scheduled advertisement start time; and
- responsive to determining that the supplemental content cannot be delivered before the scheduled advertisement start time, canceling the particular request.

14. The non-transitory computer-readable storage medium according to claim 8, wherein the supplemental content corresponds to a replacement advertisement to replace an advertisement communicated in the program content.

15. A computing system comprising:
- a processor; and
- a non-transitory computer-readable storage medium, having stored thereon program instructions that, upon execution by the processor, cause performance of a set of operations comprising:
  - receiving, from each of a plurality of content presentation devices, a request for supplemental content, wherein each content presentation device is configured to present program content received from a content distribution system, wherein the program content is associated with a program schedule that specifies an advertisement start time;
  - determining, by the processor and for each of the plurality of content presentation devices, a supplemental content processing time that corresponds to an amount of time required by a particular content presentation device to receive the supplemental content to facilitate presentation of the supplemental content;
  - scheduling, by the processor, the plurality of content presentation devices to receive requested supplemental content according to corresponding supplemental content processing times and advertisement start times, wherein content presentation devices having higher supplemental content processing times and earlier advertisement start times are scheduled to begin receiving requested supplemental content before content presentation devices associated with lower supplemental content processing times and later advertisements start times; and
  - communicating requested supplemental content according to the schedule.

16. The computing system according to claim 15, wherein determining the supplemental content processing time comprises:

determining a network speed for a content presentation device.

17. The computing system according to claim 16, wherein the content presentation device is configured to determine the network speed and communicate the network speed in the request.

18. The computing system according to claim 15, wherein the set of operations further comprise:
- determining a content distribution system delay that corresponds to a difference between the advertisement start time specified in the program schedule and an actual time at which a corresponding advertisement will be presented on the content presentation device; and
- determining an adjusted advertisement start time as a sum of the advertisement start time specified in the program schedule and the content distribution delay;
- wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

19. The computing system according to claim 15, wherein the set of operations further comprise:
- determining an occurrence of a pause operation on a particular content presentation device during which program presentation is paused, and a duration of the pause operation; and
- determining an adjusted advertisement start time as a sum of the advertisement start time specified in the program schedule and the duration of the pause operation;
- wherein scheduling the plurality of content presentation devices to receive requested supplemental content according to supplemental content processing times and advertisement start times comprises scheduling the plurality of content presentation devices to receive requested supplemental content according to supplemental content processing times and adjusted advertisement start times.

20. The computing system according to claim 15, wherein the set of operations further comprise:
- determining, by the processor and based on the supplemental content processing time and the advertisement start time, that a particular request for supplemental content cannot be delivered before the scheduled advertisement start time; and
- responsive to determining that the supplemental content cannot be delivered before the scheduled advertisement start time, canceling the particular request.

* * * * *